(12) United States Patent
Campi

(10) Patent No.: US 10,112,521 B2
(45) Date of Patent: Oct. 30, 2018

(54) SNOW-CAT WITH INCREASED FUNCTIONALITY

(71) Applicant: SNOOD S.r.l., Vipiteno (BZ) (IT)

(72) Inventor: Andrea Campi, Aprica (IT)

(73) Assignee: SNOOD S.R.L., Vipiteno (IT)

( * ) Notice: Subject to any disclaimer, the term of this patent is extended or adjusted under 35 U.S.C. 154(b) by 0 days.

(21) Appl. No.: 15/519,529

(22) PCT Filed: Oct. 14, 2015

(86) PCT No.: PCT/EP2015/073799
§ 371 (c)(1),
(2) Date: Apr. 14, 2017

(87) PCT Pub. No.: WO2016/059120
PCT Pub. Date: Apr. 21, 2016

(65) Prior Publication Data
US 2017/0225603 A1  Aug. 10, 2017

(30) Foreign Application Priority Data

Oct. 15, 2014 (IT) ............... MI2014A1791

(51) Int. Cl.
| | |
|---|---|
| *B60P 3/025* | (2006.01) |
| *E01H 4/02* | (2006.01) |
| *B60H 1/00* | (2006.01) |
| *B62D 33/063* | (2006.01) |
| *B62D 55/06* | (2006.01) |
| *B60R 15/00* | (2006.01) |

(52) U.S. Cl.
CPC ............... *B60P 3/025* (2013.01); *B60H 1/00* (2013.01); *B60R 15/00* (2013.01); *B62D 33/063* (2013.01); *B62D 55/06* (2013.01); *E01H 4/02* (2013.01)

(58) Field of Classification Search
CPC .......... B60P 3/025; B60P 3/0257; B60P 3/34; B62D 55/06; E01H 4/02
USPC ..................................... 296/22, 156
See application file for complete search history.

(56) References Cited

U.S. PATENT DOCUMENTS

| | | | |
|---|---|---|---|
| 1,436,286 A | 11/1922 | Ouradnik | |
| 2,878,883 A * | 3/1959 | France ................. | B60F 3/0007 180/23 |
| 4,768,601 A * | 9/1988 | Okano .................... | B60G 5/02 180/235 |
| 6,640,915 B2 * | 11/2003 | Haringer .............. | A01B 51/026 180/6.24 |
| 7,021,010 B2 * | 4/2006 | Smith ....................... | E04B 1/14 296/210 |
| 7,086,490 B2 * | 8/2006 | Haringer .............. | B62D 55/125 180/6.44 |

(Continued)

FOREIGN PATENT DOCUMENTS

FR        2951215 A1       4/2011

OTHER PUBLICATIONS

International Search Report dated Dec. 21, 2015 re: Application No. PCT/EP2015/073799; pp. 1-3; citing: FR 2 951 215 A1, U.S. Pat. No. 1,436,286 A and US 2014/203584 A1.

(Continued)

*Primary Examiner* — Pinel E Romain
(74) *Attorney, Agent, or Firm* — Dorsey & Whitney LLP

(57) ABSTRACT

A snow-cat, comprising a cabin, the cabin being equipped with a galley for preparing and serving food products and/or beverages.

8 Claims, 6 Drawing Sheets

(56) References Cited

U.S. PATENT DOCUMENTS

| | | | | |
|---|---|---|---|---|
| 8,596,707 B2* | 12/2013 | Fiander | ............... | B60P 3/341 |
| | | | | 135/126 |
| 9,505,307 B2* | 11/2016 | Champagne | ............ | B60L 1/02 |
| 2014/0203584 A1 | 7/2014 | White et al. | | |

OTHER PUBLICATIONS

Written Opinion dated Dec. 21, 2015 re: Application No. PCT/EP2015/073799; pp. 1-4; citing: FR 2 951 215 A1, U.S. Pat. No. 1,436,286 A and US 2014/203584 A1.
"Mammoth Mountain SM: Burrito Cat", URL:https://www.youtube.com/watch?v=vStFjjB-mLc, Youtube Video Retrieved from the Internet Apr. 10, 2018, Dec. 28, 2010.

\* cited by examiner

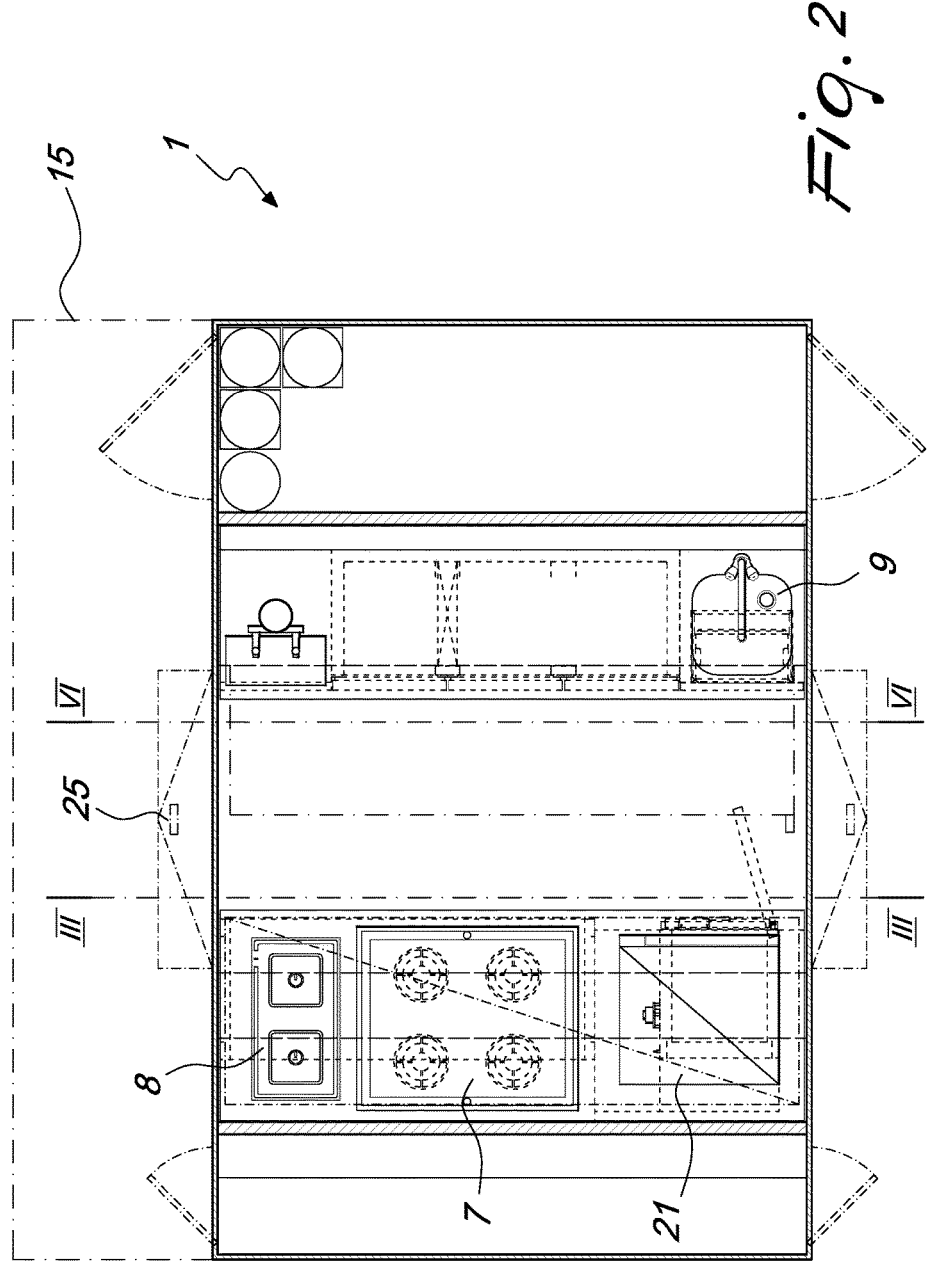

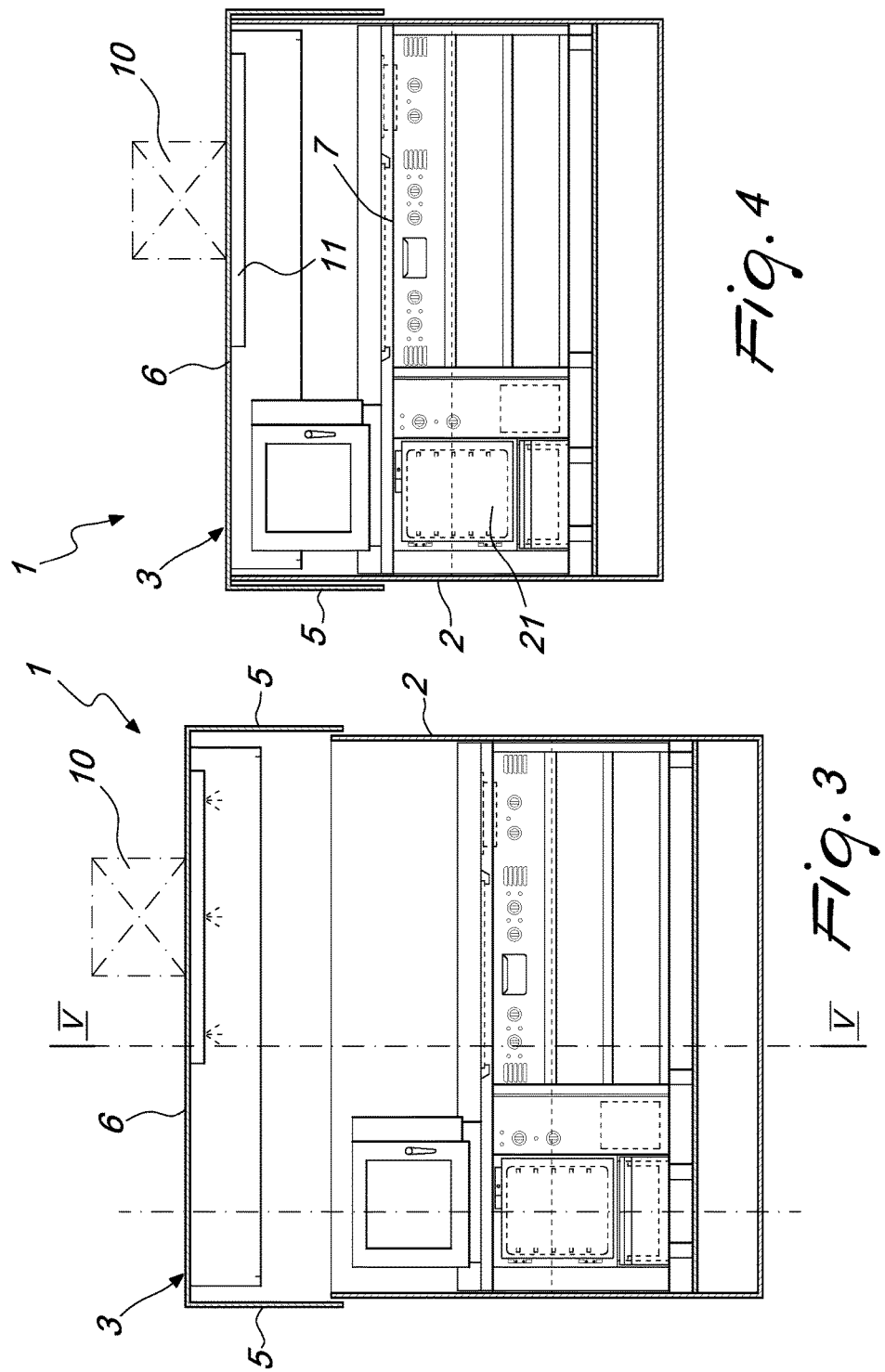

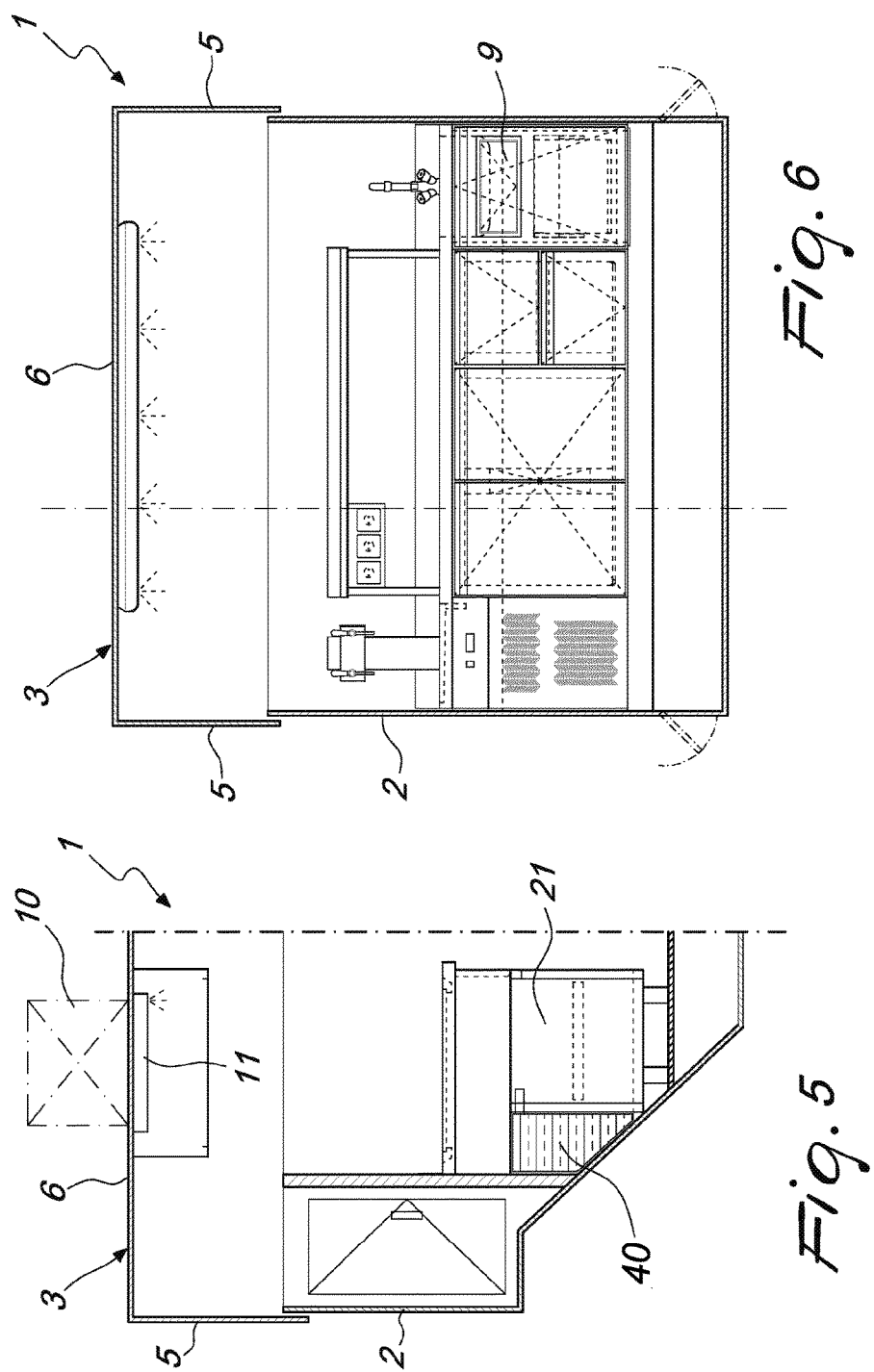

SNOW-CAT WITH INCREASED FUNCTIONALITY

TECHNICAL FIELD

The present invention relates to a snow-cat with increased functionality. More specifically, the invention relates to a snow-cat that can be used for refreshment/entertainment purposes.

BACKGROUND

As is known, at times when ski pistes are closed to skiers, snow-cats are used to "groom" the pistes, in order to create an optimal surface for skiers.

Use of the snow-cat is therefore confined to times when the pistes are not in use, so as to prepare them for when the pistes will be open.

At the end of their use, the snow-cats are then usually parked in areas adjacent to the pistes.

Moreover the need is felt, off-piste, to have refreshment points that can enable skiers to consume quick meals, between one descent and the next, without losing too much time and especially without having to descend too far downhill.

However, as is evident, refreshment points cannot be provided in some positions, given the inconvenience, difficulty of access and, especially, the difficulty of provisioning with food products.

Therefore, refreshment points, huts, refuges or the like, are usually built in areas that are easily accessible, with relatively ample spaces available.

BRIEF SUMMARY

The aim of the present invention is to provide a snow-cat with increased functionality, which is therefore capable of performing both a piste-grooming function and a refreshment point function.

Within this aim, a snow-cat is provided that can therefore be positioned at any point along pistes and serve as a refreshment point for skiers.

A snow-cat is further provided that combines a conventional structure adapted to groom the pistes with a structure adapted to provide quick meals to skiers.

The disclosure also provides a snow-cat that is highly reliable, easily and practically implemented and low cost.

More specifically, the disclosure provides a snow-cat, comprising a cabin, which is characterized in that said cabin is equipped with a galley for preparing and serving food products and/or beverages.

BRIEF DESCRIPTION OF THE DRAWINGS

Further characteristics and advantages of the invention will become better apparent from the description of a preferred, but not exclusive, embodiment of the snow-cat according to the present invention, which is illustrated by way of non-limiting example in the accompanying drawings wherein:

FIG. 2 is a sectional plan view of the cabin of the snow-cat according to the present invention;

FIG. 3 is a sectional view of the cabin of the snow-cat according to the invention, taken along the line III-III in FIG. 2;

FIG. 4 is the same view as FIG. 3 but in a non-operational configuration;

FIG. 5 is a sectional view taken along the line V-V in FIG. 3;

FIG. 6 is a sectional view taken along the line VI-VI in FIG. 2;

DETAILED DESCRIPTION

Figure 1:
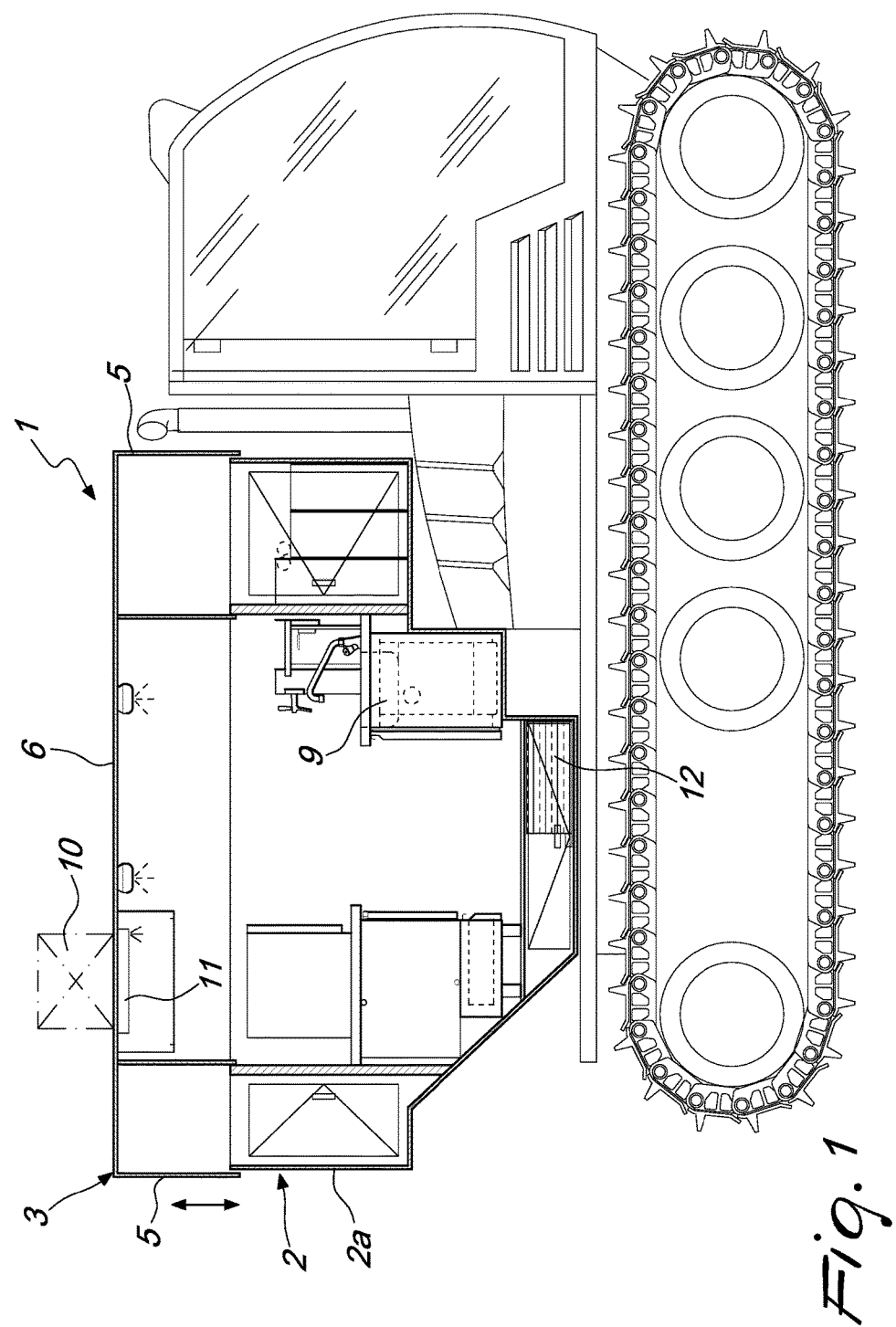
FIG. 1 is a transparent side elevation view of the cabin of the snow-cat according to the present invention.
Figure 7:
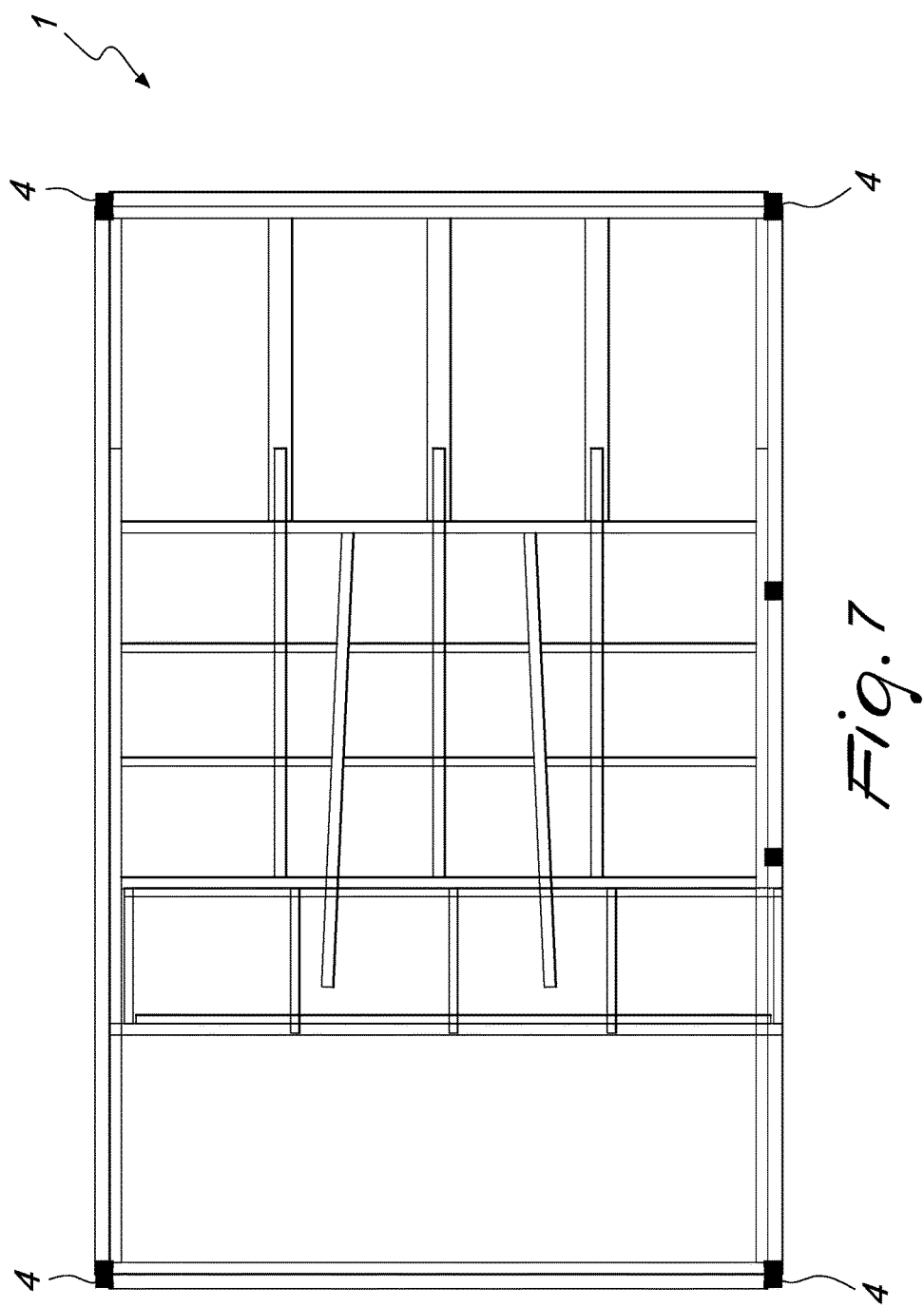
FIG. 7 is a plan view of the cabin of the snow-cat according to the invention.
Figure 8:
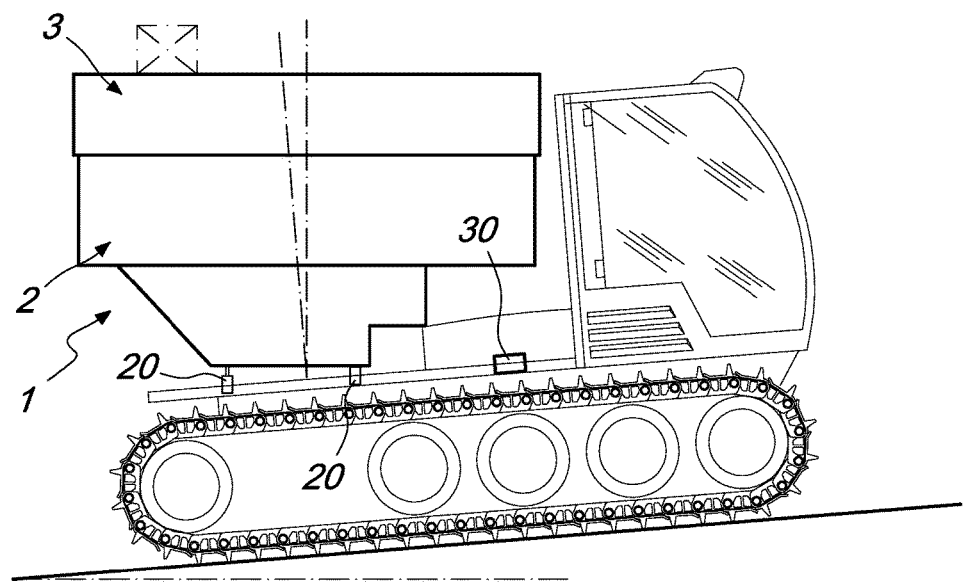
FIG. 8 is a side elevation view of the snow-cat according to the present invention.
Figure 9:
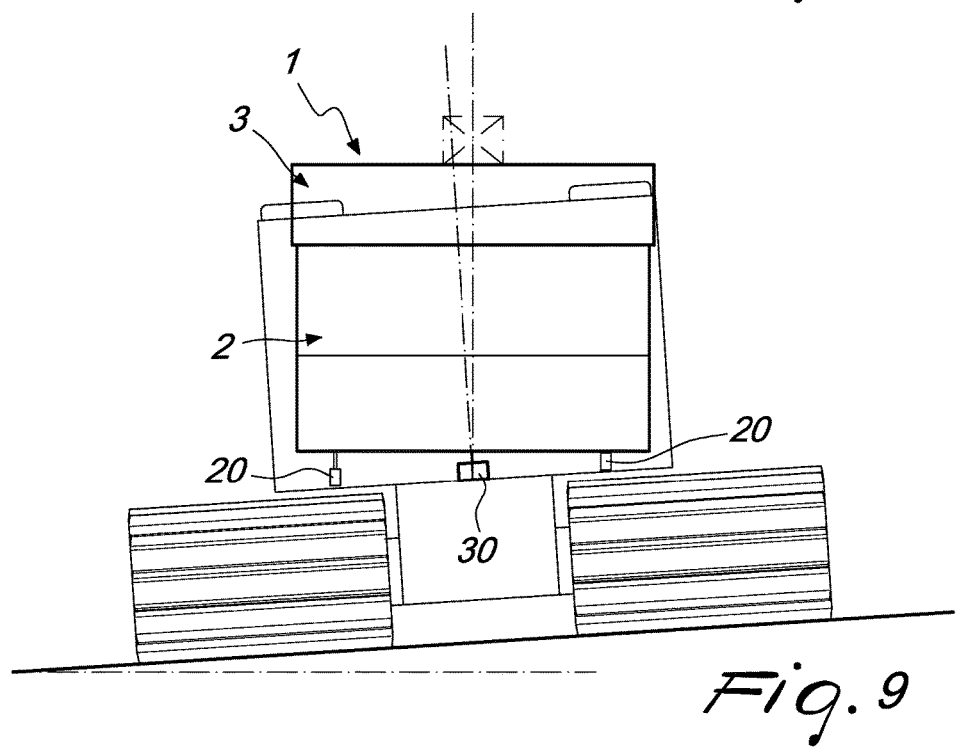
FIG. 9 is a rear view of the snow-cat according to the present invention.

With reference to the figures, in which identical reference numerals designate identical elements, the snow-cat according to the invention is designated by the reference numeral 1.

The cabin, designated by the reference numeral 2, comprises an upper or roof portion 3 which includes one or more walls 5 and is telescopically coupled to the lower portion 2a of the cabin.

At least one, and preferably a plurality of hydraulic pistons 4, make it possible to raise and lower the upper portion of the cabin so as to bring it from a non-operational condition, as shown in FIG. 4, to an active condition, as shown in FIGS. 1, 3, 5 and 6. In this manner, the encumbrances of the snow-cat can be contained and it can be easily transported by road with adapted trucks, without needing to avail of special transport.

The upper portion 3 of the cabin is provided with walls 25 which are hinged to the roof 6 of the upper portion 3 of the cabin; the walls 25 can be opened so as to increase the roof surface so offering greater coverage to customers in the event of snowfalls, and furthermore they will constitute openings through which the food will be served.

The peculiarity of the snow-cat according to the invention therefore lies not only in the fact that the upper portion 3 of the cabin is almost totally liftable, but also in the fact that it has a galley inside which is adapted to serve food products to users.

Therefore, inside the cabin are a cooktop 7, an induction cooktop 8, a washbasin 9 with associated faucets, a refrigerator 9, and all the equipment necessary for rendering a galley operational and functional.

On the upper surface 6 of the roof 3 there is a turret 10 for aspiration, which is provided with filters 11 in a downward region.

In a lower position, i.e. at the bottom of the cabin, there is at least one waste water tank 12, which is insulated and slightly inclined so as to ensure that no residue can remain inside it.

The cabin is further provided with a system for heating by way of Diesel fuel ultra-low consumption heat pumps (of the Webasto® type), which ensure the liquid state of the water supply tank and the waste water tank, and a positive temperature of the cold chain of the foods.

In order to solve the problem of the operations being at a higher level than the ground where the users are, the cabin according to the invention has retractable platforms, shown in FIG. 2 and designated by the reference numeral 15, which make it possible to bring the user to the level of the operator by way of steps with a handrail, not shown.

The reference number 40 designates the water tank, which is arranged in a forward position with respect to the heat pump 21.

In substance, the snow-cat according to the invention makes it possible to carry out the normal function of piste-grooming as well as acting as a refreshment point with integrated galley for skiers on the piste.

The snow-cat is then completed by an outside lighting assembly, an audio system, and a monitor for offering video content, all powered by a generator inserted in an adapted container hung on the front blade of the piste-groomer (not shown).

The generator is fueled with the Diesel fuel in the fuel tank of the snow-cat, while the movement of the roof 3 by way of the hydraulic pistons 4 is achieved through the hydrostatic system of the snow-cat.

Since the snow-cat is requested to operate on steep areas and it is not always possible to find flat places where to park the snow-cat, it is important that the cabin of the snowcat could allow an operator to use the snow-cat as a refreshing point, without being hindered by the fact that the snowcat and thus its cabin is inclined.

Accordingly, the lower portion of the cabin 2 is provided with lifting means 20 that are for example provided by hydraulic or air pistons that are arranged so as to push under the floor of the cabin and thus keep the cabin always horizontal independently of the configuration of the ground whereon the snow-cat is parked.

The lifting means 20 are suitably controlled and actuated by a signal provided by level sensor means 30 that are adapted to provide the degree of inclination of the cabin and thus drive the lifting means so as to restore the attitude of the cabin by compensating the degree of inclination around two different axis, one along the longitudinal extension of the cabin 2 and one along the transverse extension of the cabin.

In this way the cabin is maintained parallel with respect to an ideal horizontal ground.

In practice it has been found that the snow-cat according to the present invention fully achieves the set aim, in that it makes it possible to integrate the twofold function of snow-groomer and refreshment point in a single vehicle.

The snow-cat, thus conceived, is susceptible of numerous modifications and variations, all of which are within the scope of the appended claims.

Moreover, all the details may be substituted by other, technically equivalent elements.

In practice the materials employed, and the contingent dimensions and shapes, may be any according to requirements and to the state of the art.

The disclosures in Italian Patent Application No. MI2014A001791 (102014902301163) from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A snow-cat configured for piste grooming, the snow cat comprising:
   two tracks;
   a front driving cab;
   a support structure coupled to the front driving cab and at least partially positioned above the two tracks; and
   a cabin positioned on the support structure and comprising a galley for preparing and serving food products or beverages.

2. The snow-cat according to claim 1, wherein said cabin comprises a lower portion and an upper portion which is connected telescopically to said lower portion.

3. The snow-cat according to claim 2, wherein said upper portion of said cabin comprises side walls that are hinged and moveable to an open position.

4. The snow-cat according to claim 1, further comprising heat sources for maintaining an optimum internal temperature inside said cabin.

5. The snow-cat according to claim 1, further comprising a waste water tank arranged at a lower part of said cabin, the tank being inclined for emptying.

6. The snow-cat according to claim 1, wherein said galley is powered by a generator arranged outside said galley.

7. The snow-cat according to claim 6, wherein the generator is fueled by Diesel fuel, being connected to the fuel tank of said snow-cat.

8. The snow-cat according to claim 6, further comprising a lifting apparatus arranged on the support structure below said cabin and adapted to keep said cabin in a constant horizontal position, said lifting apparatus being controlled and actuated by a signal provided by a level sensor.

* * * * *